(12) United States Patent
Da Silva

(10) Patent No.: US 8,721,378 B2
(45) Date of Patent: May 13, 2014

(54) WATER TRACTOR WITH FLOATING TRACKS

(76) Inventor: Vilson Da Silva, Sao Paulo (BR)

( * ) Notice: Subject to any disclaimer, the term of this patent is extended or adjusted under 35 U.S.C. 154(b) by 0 days.

(21) Appl. No.: 13/635,164

(22) PCT Filed: Feb. 25, 2011

(86) PCT No.: PCT/BR2011/000061
§ 371 (c)(1),
(2), (4) Date: Oct. 8, 2012

(87) PCT Pub. No.: WO2011/113124
PCT Pub. Date: Sep. 22, 2011

(65) Prior Publication Data
US 2013/0017741 A1    Jan. 17, 2013

(30) Foreign Application Priority Data
Mar. 15, 2010  (BR) .................................. PI 1000730

(51) Int. Cl.
*B63H 1/34*  (2006.01)
(52) U.S. Cl.
USPC ........ 440/96; 440/12.63; 440/12.64; 305/101
(58) Field of Classification Search
USPC .............. 440/12.63, 12.64, 96; 305/100, 101, 305/114
See application file for complete search history.

(56) References Cited

U.S. PATENT DOCUMENTS

| 4,772,237 | A | * | 9/1988 | Zalkauskas | 440/96 |
| 4,846,091 | A | * | 7/1989 | Ives | 440/12.63 |
| 4,846,092 | A | * | 7/1989 | Wilson | 440/12.64 |
| 4,961,395 | A | * | 10/1990 | Coast | 440/12.64 |
| 5,379,709 | A | * | 1/1995 | Wilkerson | 440/12.64 |
| 5,899,164 | A | * | 5/1999 | Coast | 440/12.63 |
| 6,918,801 | B2 | * | 7/2005 | Wilson et al. | 440/12.63 |
| 8,277,267 | B1 | * | 10/2012 | Chippas | 440/12.63 |
| 2013/0017741 | A1 | * | 1/2013 | Da Silva | 440/96 |

FOREIGN PATENT DOCUMENTS

| FR | 2 617 789 A1 | 1/1989 |
| FR | 2617789 A1 * | 1/1989 |
| WO | WO 03/006305 A1 | 1/2003 |
| WO | WO 2007/086912 A3 | 8/2007 |
| WO | WO 2009/033153 A3 | 3/2009 |

OTHER PUBLICATIONS

FR 2 617 789, Lanchier Jean Marc—English Abstract, Jan. 13, 1989.
PCT/BR2011/000061, filed on Jun. 13, 2011 "International Search Report", mail date Jun. 16, 2011.

* cited by examiner

*Primary Examiner* — Lars A Olson
*Assistant Examiner* — Jovon Hayes
(74) *Attorney, Agent, or Firm* — McKee, Voorhees & Sease, P.L.C.

(57) ABSTRACT

The present patent consists of a vehicle equipped with a series of floating caterpillars that circulate on an ovoid rail, forming a continuous track; the male-female couplings between the traction caterpillars, their hydrodynamic locks and their direction system operate with the braking of one of the sides of the track and the slipping of the opposite track, being able to rotate through 360°. Said vehicle has the purpose of towing load barges on rivers or lakes. Due the absence of displacement, since the vehicle moves on the water, the performance is distinctly improved and the fuel consumption is considerably reduced in comparison with watercraft having an equivalent load-carrying capacity.

2 Claims, 5 Drawing Sheets

WATER TRACTOR WITH FLOATING TRACKS

CROSS-REFERENCE TO RELATED APPLICATIONS

This application is a U.S. National Phase of PCT/BR2011/000061 filed Feb. 25, 2011, which claims priority to PI1000730-0 filed Mar. 15, 2010, herein incorporated by reference in their entirety.

BACKGROUND OF THE INVENTION

This patent of invention relates to a tractor that moves in the water through tracks composed by floats for being used in towing of barges and similar, in order to increase fuel economy and the ability of traction of loads on water.

Tractors of tracks that move on land, mud or bogs through special tracks are already known. Despite the widespread use of these vehicles, there is a place where the traffic is impossible, namely the water surface, due to the great weight of the equipment and the absence of floats. Conventional tugs, i.e. boats with large propellers, consume large amounts of fuel, due to their large engines.

Other problems occur when they are used in shallow waters, which are the crash of propellers at the bottom of the river or sea, causing breakage and also the limited maneuverability of this kind of watercraft.

Due to these problems and with the purpose of overcoming them, it was developed a water tractor with floating tracks, with a set of caterpillars made of polyurethane foam, covered with fiberglass and incorporated into the piece, as well as locks that work as oars in each of these tracks, giving to them great traction capacity in the water. As track tractor, it has a rotation of 360° at the same point, which gives it great maneuverability, being able to operate in small spaces.

SUMMARY OF THE INVENTION

This way of transit in the water eliminates the power lost occurred by the displacement with the production of hydrodynamic drag and the turbulence of the clashing of the blades in the water, since, as this tractor passes over the water, there is no such displacement. The Anti-turbulence Fairing System, between the Caterpillars, provides an extremely smooth roll of tracks by removing the crash with water. Thus the ability of traction of the equipment increases exponentially, reducing fuel consumption, allowing, despite the small size, the pulling up of large barges at a rate above the average developed by other watercrafts.

By having little draught, this equipment can operate in extremely shallow water without risk of crash with the background or stranding in sandbars, common in silted rivers, not requiring port infrastructure, being able even to put the barge towing ashore for discharge.

Massive caterpillars of polyurethane foam, covered with fiberglass, besides to present great impact resistance and therefore durability and security for all equipment, they allow greater buoyancy, eliminating or reducing the risk of sinking by flooding due to collisions, ruptures of the hull, and others. As the caterpillars of the track are attached to a train or an ovoid scroll, even if one or more caterpillars are damaged, the vehicle is not in danger of sinking, since most of said caterpillars remains still attached to the equipment, allowing its full buoyancy.

BRIEF DESCRIPTION OF THE DRAWINGS

The attached drawings show the water tractor with floating tracks and its parts, which are the subject of this patent of invention.

DETAILED DESCRIPTION OF THE DRAWINGS

Figure 1:
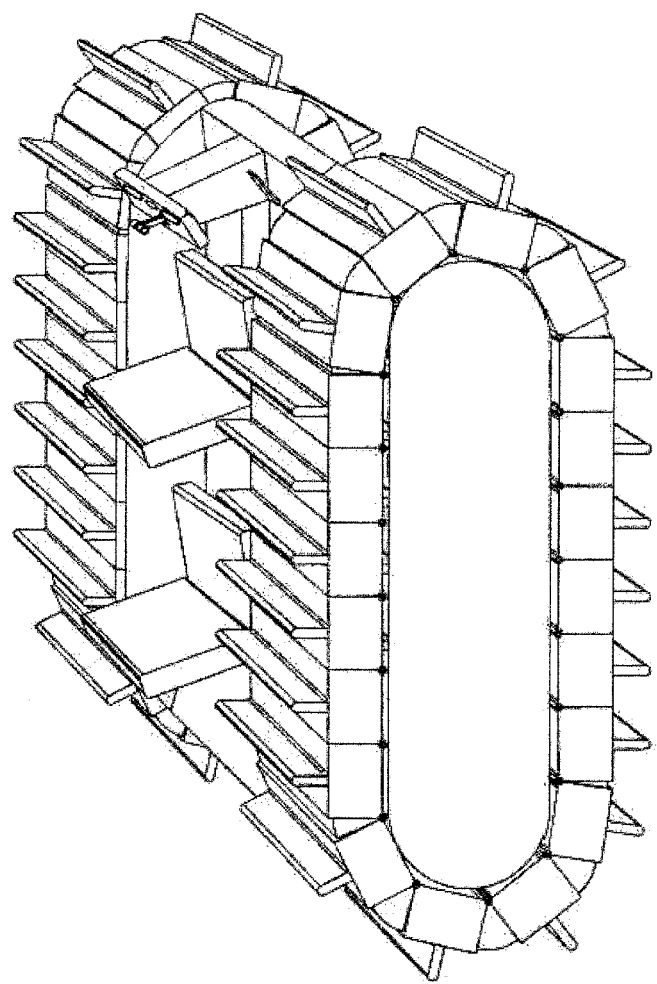
FIG. 1 shows a side view of the complete tractor.
Figure 2:
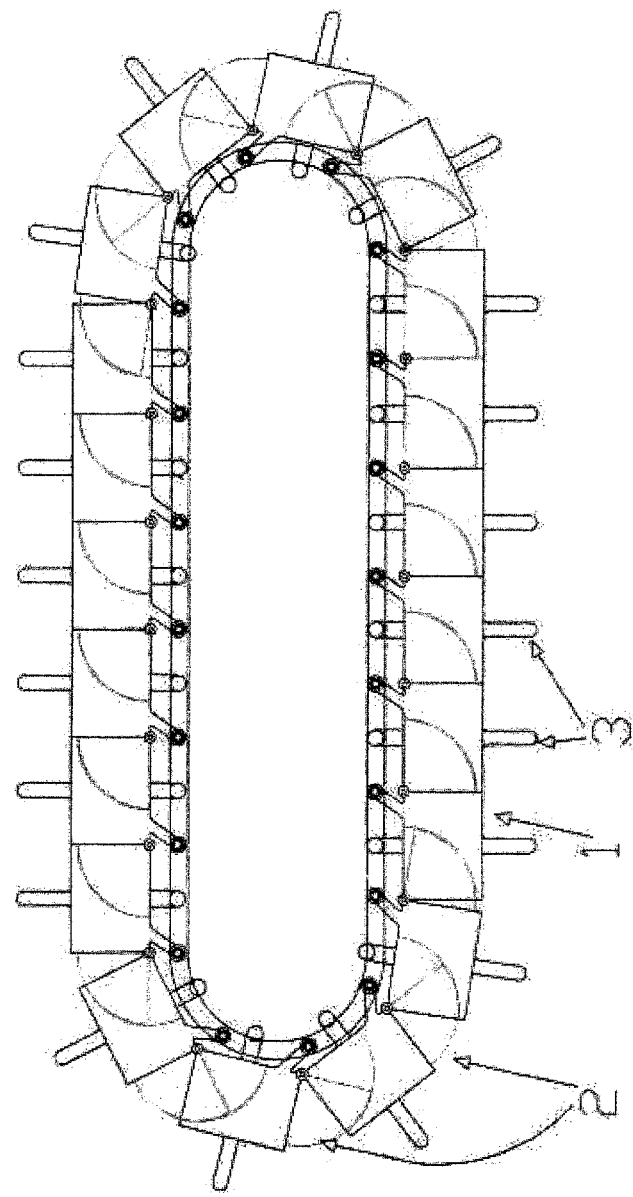
FIG. 2 shows a view of the floating tracks (1), with the transparencies of the Anti-turbulence System (2) and its Water Locks (3).
Figure 3:
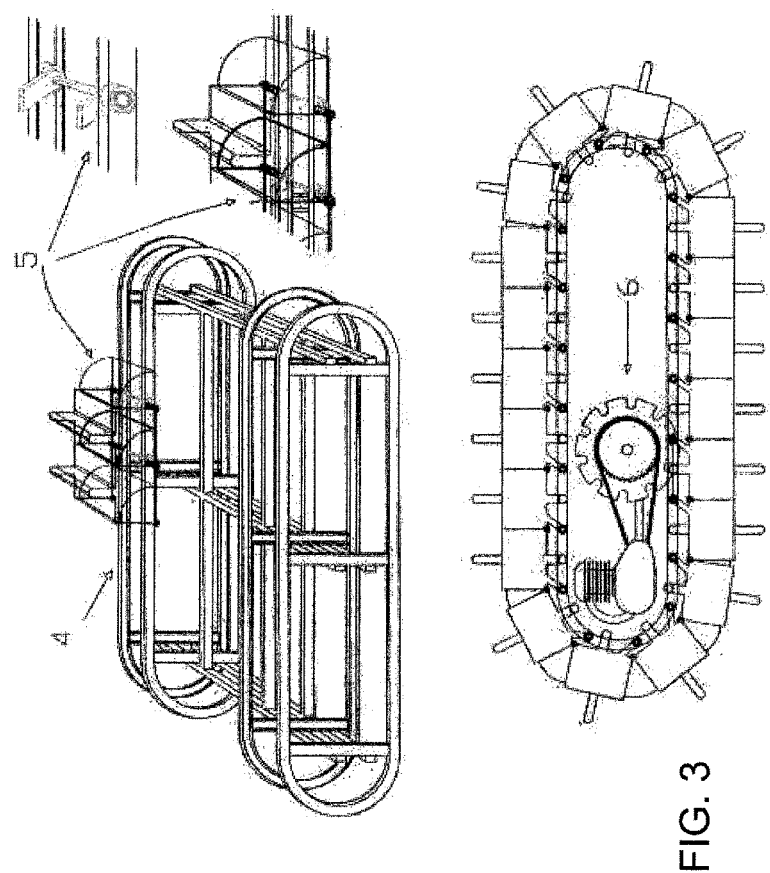
FIG. 3 shows the details of the Ovoid Rails (4) set, for where the caterpillars pulleys showed in the detail (5) circulate and are fixed to the Traction Rack (6).
Figure 4:
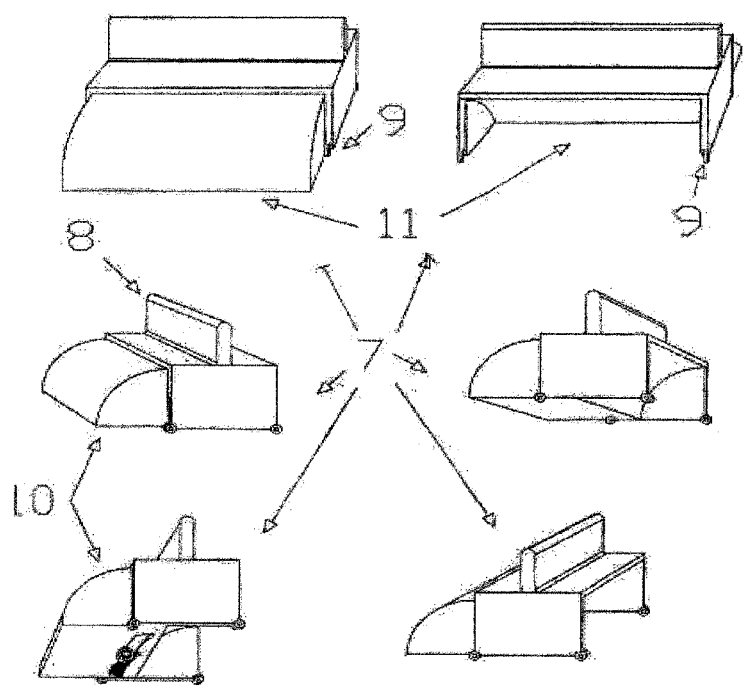
FIG. 4 shows different angles of caterpillars (7) that make part of the track with Caterpillar Lock (8), Fitting between the Caterpillars (9), Mobile Anti-turbulence Fairing System (10) and details of the Male-Female Fairing System (11).
Figure 5:
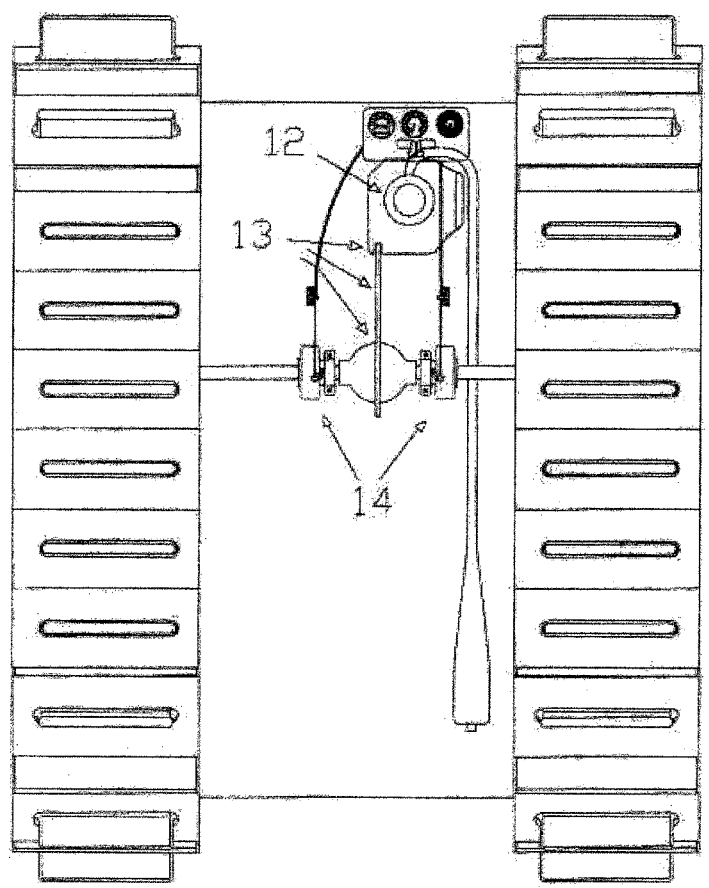
FIG. 5 shows a top view of the equipment, glimpsing up the Systems of Driving (12) Transmission (13) and Direction (14).

In accordance with what are showed in the figures listed above, the water tractor with floating tracks (FIG. 1) is composed by a vehicle equipped with a series of floating caterpillars (FIG. 2) that circulate by a set of ovoid rails, through a set of polyethylene pulleys with internal shielded bearing. The caterpillars are connected to each other like a chain and moved by traction of a rack, which is connected to the differential through an independent axis tip moved by conventional motor and transmission of land vehicles, everything scaled according to the user's need.

The direction system operates by activating the brake to the side to which to turn the vehicle, through planetary system of the differential, the movement of the opposite track continues, causing the vehicle to turn.

The locking system of caterpillars works as multiple oars, giving more power of traction on the water.

The invention claimed is:
1. A water tractor with floating tracks, comprising: a vehicle equipped with floating tracks (1) that include a plurality of floating caterpillars (7) pivotally connected to each in a continuous loop, an anti-turbulence (2) system including fairings between the caterpillars, and water locks (3); the floating tracks circulate through a set of ovoid rails, through a set of polyethylene pulleys with internal shielded bearing, said caterpillars are moved by traction of a rack, which is connected to a differential through an independent axis tip moved by motor and transmission of land vehicles and by a locking system of caterpillars, working as multiple oars, giving more power of traction on the water.

2. The water tractor with floating tracks, according to claim 1, wherein a steering system acts through activation of a brake side to which to turn the vehicle, through a planetary differential.

* * * * *